Figure 1:
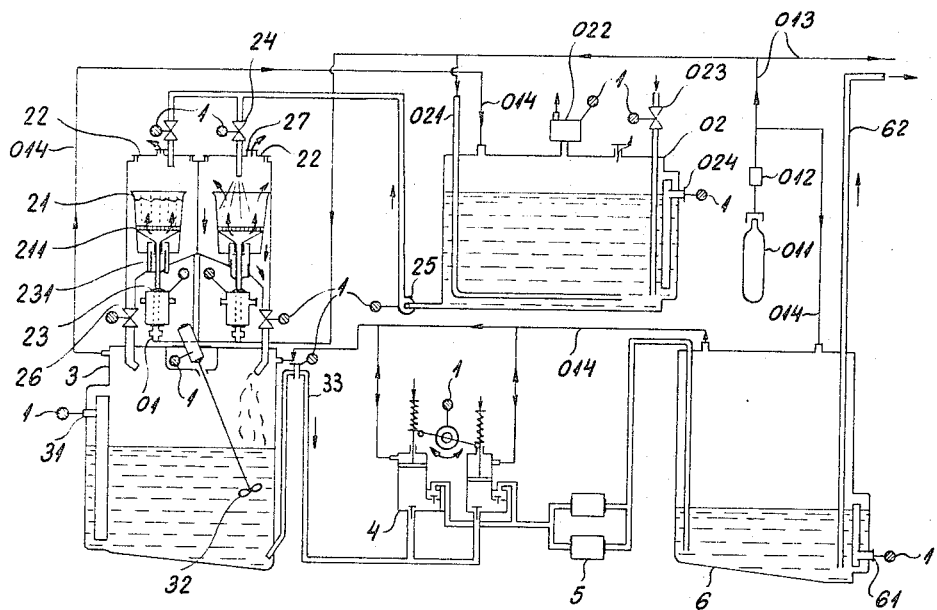

ns PatentOffice 3,376,688
Patented Apr. 9, 1968

3,376,688
METHOD AND EQUIPMENT FOR THE AUTOMATIC PREPARATION OF STERILE AND FIBRE-FREE LIQUID PHARMACEUTICAL PRODUCTS OF HIGH STABILITY FILLED IN AMPOULES, IN A PROTECTIVE ATMOSPHERE
Géza Takács, 3 Nyul utca; István Nyitrai, 10 Fo utca; Félix Láng, 23 Marvany utca; Egon Pandula, 27 Abonyi utca; Béla Juhász, 2 Gyori utca; and Ernö Pungor, 1a Bosnyak ter, all of Budapest, Hungary
Filed Mar. 21, 1966, Ser. No. 535,866
Claims priority, application Hungary, Mar. 27, 1965, PU-143
18 Claims. (Cl. 53—21)

The invention relates to a method and equipment for the automatic preparation of sterile and fiber-free liquid pharmaceutical products of high stability stored in ampoules, in a protective atmosphere.

The mass production of pharmaceuticals and the rapid increase of the number of pharmaceutical products promote more and more improvements in the technology of preparations stored in ampoules. The basic principle is that the solution is to be prepared of the active substance so that the preparation should contain a minimum of germs. Provision is to be made for exempting the preparation from physical impurities and thus for its utmost stability and preservability as well.

Practically complete sterility can be achieved if from the beginning of the operations until the sealing of the ampoule the number of germs is kept at the lowest possible level. This is extremely difficult since the receptacles and equipment used for the preparation of the active and auxiliary substances, solvents and diluents, etc., as well as the air in the plant, the presence and the activity of the staff, the periodical character and the protraction of the drug-preparing operations in space and time all present serious dangers of contamination.

The conventional methods and equipment for the preparation of pharmaceuticals meet almost none of these requirements adequately. With most of the conventional methods and equipment, the atmospheric oxygen can penetrate into the ampoule between the operations of filling and sealing so that in order to provide for the stability of the product, especially in case of easily oxidizable pharmaceutical preparations, it is absolutely necessary to include in the product a relatively great amount of sulphite and other stabilizing agents which are mostly not without harm to health. Oxygen contamination may also occur on account of the turbulent gas currents arising in the course of sealing. This was the reason why attempts were made to carry out filling and sealing operations under nitrogen or carbon dioxide protective atmosphere. Unfortunately, none of these allowed eliminating the antioxidant required for therapeutic reasons. The nitrogen gas—otherwise suitable—changes quickly into air from the open ampoule, in consequence of the difference in specific weight. The carbon dioxide (carbonic anhydride) may cause a change of the pH, i.e., react with a component of the solution in the ampoule.

In a preferred conventional method and equipment the ampoules are washed and dried, sterilized, then filled with the sterilized solution previously prepared, and sealed; all these operations are carried out in one single process with relatively small space requirements, i.e., 7, 8 cu. m., with a staff of two (Pharm. Ind., 23, 1961, pp. 567–572). This however allows eliminating only the contamination caused by the immediate operations. On the other hand, the common drawback of all known methods and apparatus consists in not providing for adequate protection and stability of modern pharmaceutic agents most of which are sensitive to adsorbed atmospheric oxygen.

It is therefore not surprising that, e.g., the vitamin C, morphine or still more the phenthiazine injections are more or less objectionable. Though the end product of morphine oxidation, the oxide morphine is a colorless substance, the intermediate products, however, of the oxidation taking place while standing are colored, so that the discolored substance containing also said intermediate products is not suitable for use. Preparations which may be suitable when prepared are useful only for five years. Phenthiazine injections, even those considered best, turn a vivid red within some months for the same reason.

The invention relates to a method and equipment which allow preparing automatically liquid pharmaceutical products to be stored in ampoules, with full elimination of the stabilizing antioxidant substances on a large scale, with maximum compliance with quality requirements such as sterility, freedom from fibers and pyrogens, accurate filling volume, etc., with a minimum space requirement, in nonsterile surroundings, with a minimum of preliminary operations, and allowing changing the ampoule size within the shortest possible time, without the efficiency being in the least impaired by the size changes or by the breaking of the ampoules. Subsequent sterilization is unnecessary and instead of checking all ampoules, it suffices to make random tests.

With the method according to the invention—after having first flushed out the complete equipment used in the course of filling by means of a hot vaporous or gaseous matter, preferably with sterilized steam—the powdered active and auxiliary substances required for preparing the solution, in their receptacles, the solvents and diluents equally in receptacles, as well as the previously washed ampoules are—either previously or preferably prior to the filling operation in the filling space itself—freed by means of sterile filtered argon protective gas from the atmospheric and adsorbed oxygen, then a solution is prepared of the active and auxiliary substances, filtered to become sterile and fiber free, then introduced by means of automatic feeding units into ampoules, and sealed; thus a pharmaceutical product containing an injection solution known per se is prepared wherein the continuous interior working space is maintained—by means of an argon protective gas atmosphere—under oxygen-free and aseptic conditions prior to and during the automatic operations carried out in one single working process, and also in the course of the necessary checking operations. Filtering is effected by means of parallel connected high-capacity microbe filters known per se and of a system maintaining the solution in circulation.

Expulsion of the atmospheric oxygen from the powdered matter is carried out preferably by fluidizing the solid matter fed into the powder receiver, by means of circulating protective gas.

The automatic preparation of the solution is carried out preferably by flushing out the active and auxiliary substances from the powder receiver into a storage receptacle by means of a protective-gas-saturated solvent. This flushing-out can be effected with the aid of centrifugal force and is continued until the prescribed concentration is reached, or the solution is adjusted to a predetermined volume by means of diluent dosage started by automatic signalling systems. In order to provide for a perfectly homogeneous solution it is possible to proceed in a way such that by preparing the solution a mixing process lasting for a predetermined period is started.

The ampoules to be filled are fed in washed condition into the apparatus. The ampoule wall is freed from moisture—preferably in the filling apparatus itself—by gas change effected by means of heat and argon protective gas. One appropriate method consists in deoxidizing the ampoules on the filling track by means of infrared radiation and blowing-in of argon gas.

With a view to avoid foaming and the resulting burning, the filling of the ampoules can be performed so that the argon protective gas is introduced above the liquid level, preferably by means of the filling needle itself so that in the course of the filling operation the argon protective gas contacts only the surface of the solution.

The highest possible degree of automatic operation and continuity of production are ensured by regulating the starting and the period of the individual work operations partly by means of time-pattern control and partly by means of one of the preliminary operations. This means that the preparation of the new injection solution is started automatically by a predetermined decrease of the amount of injection solution of the previous dose discharged in the course of the filling. Similarly, in case of a number of powder doses fed in simultaneously, the preferably fluidization-type deoxidation of the next powder dose or doses is initiated by the start of the dissolving process to be carried out in one of the receptacles.

The equipment suitable for carrying out the method according to the invention is an automatic apparatus to be assembled from units of a design otherwise known per se, this apparatus being provided with a batching space that has one or more solid material storing and batching receptacles which are defined by the capacity of the diluent receptacle, these receptacles being suitable for establishing fluidization and for deoxidation by means of argon gas filling, the batching space having further a receptacle for preparing, mixing and diluting the injection solution, connected with the batching space which is fitted with one or more electric, magnetic, mechanical or other level indicators that indicate the useful capacity of the diluting space and control the batching by its indication, the batching space having further in its mixing space an automatic electric or magnetic agitator known per se, to be started through the control system from the level indicator by the reaching of the liquid level itself and operated during a programmed mixing period that can be subordinated to other conditions as well. Important parts of the equipment according to the invention are: a system of pumps connected to the injection solution preparation receptacle, operating under argon gas and working with a piston head lubricated only with the liquid to be introduced; a system of filters known per se arranged after the system of pumps, providing for an ultra-filtration in the colloidal sense, effecting the removal of microorganisms and mechanical contaminants, and ensuring thus freedom from fibers; a liquid receptacle for the storage of the filtered solution, suitable for filling with argon gas as protective atmosphere, fitted with one or more electric, magnetic or mechanical level indicators in the lower third portion of the wall, with a control system connected with the level indicator(s) and starting the delivery of the solution in the diluting space; a filling unit operating under inert gas, dispensing into previously deoxidized ampoules, equipped with a system of pumps feeding through filling needles, working with a piston head lubricated only by the injection solution to be introduced, filling and sealing the ampoules one by one during their handling, this filling unit being fitted, if necessary with an ampoule chute and possibly with a collecting receptacle connected thereto, having also, if necessary, an ampoule head collecting track arranged above the filling table. The equipment has furthermore an ampoule orienting conveyor and an ampoule feeding device.

Figure 2:
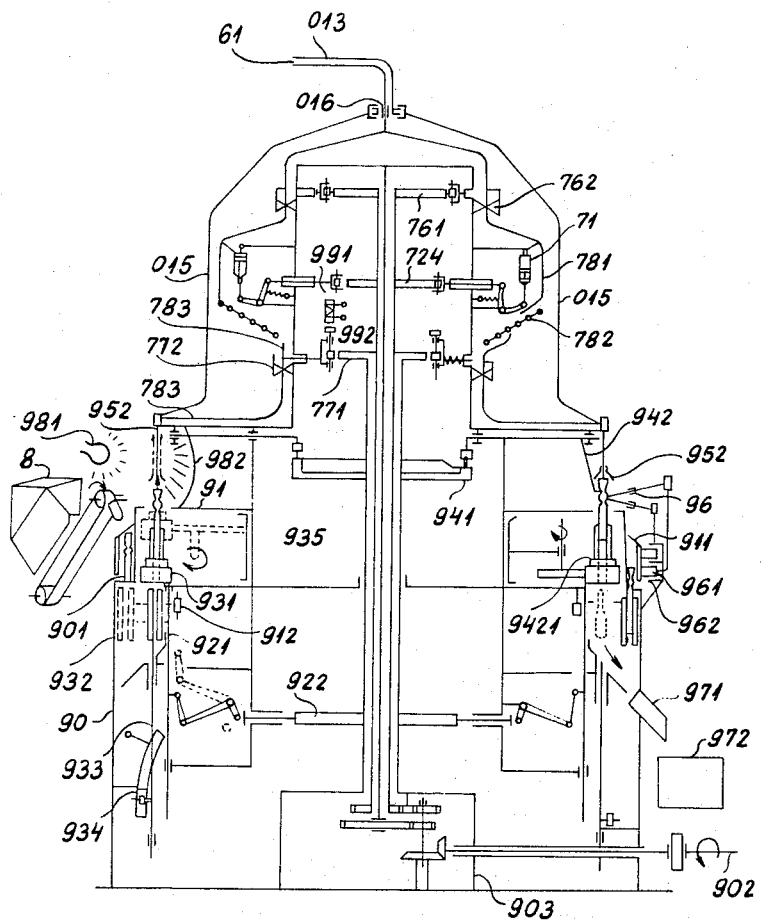
Figure 5:
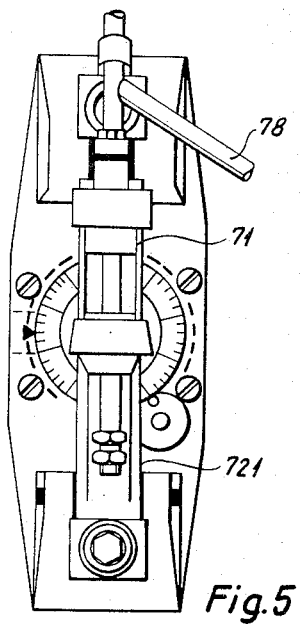
Figure 3:
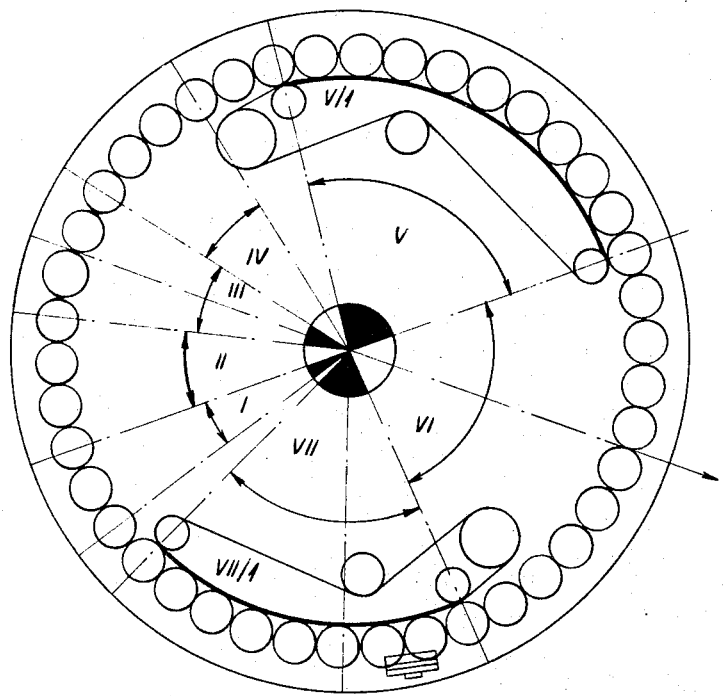
Figure 4:
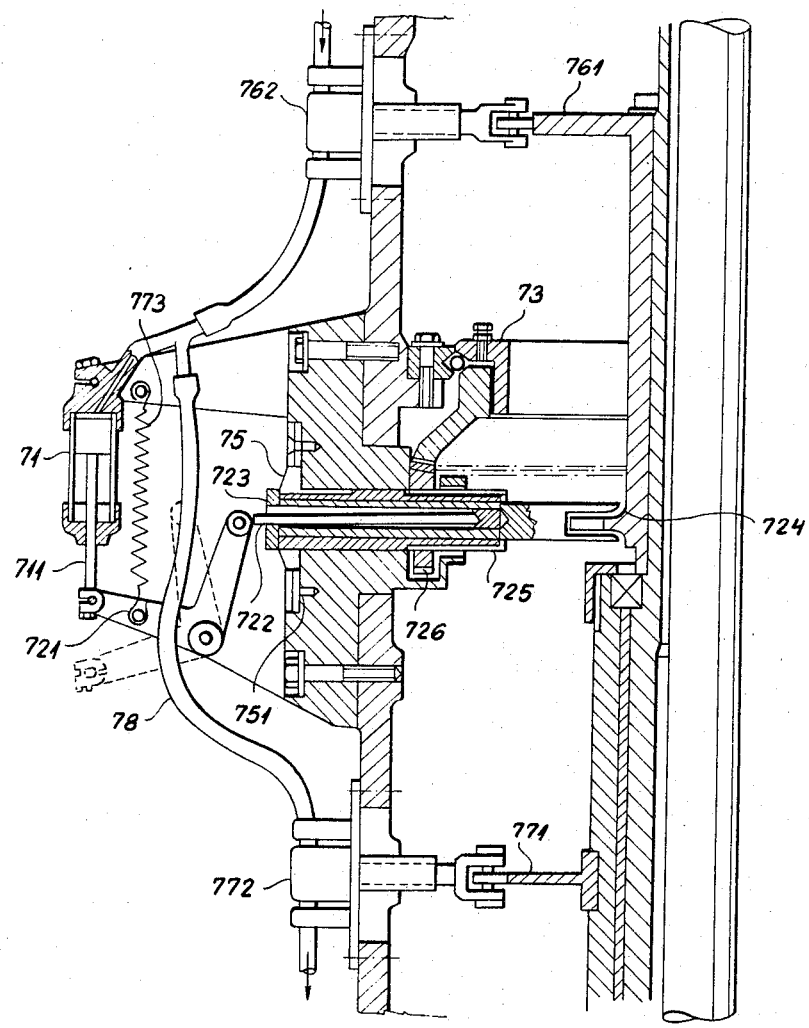
Figure 6:
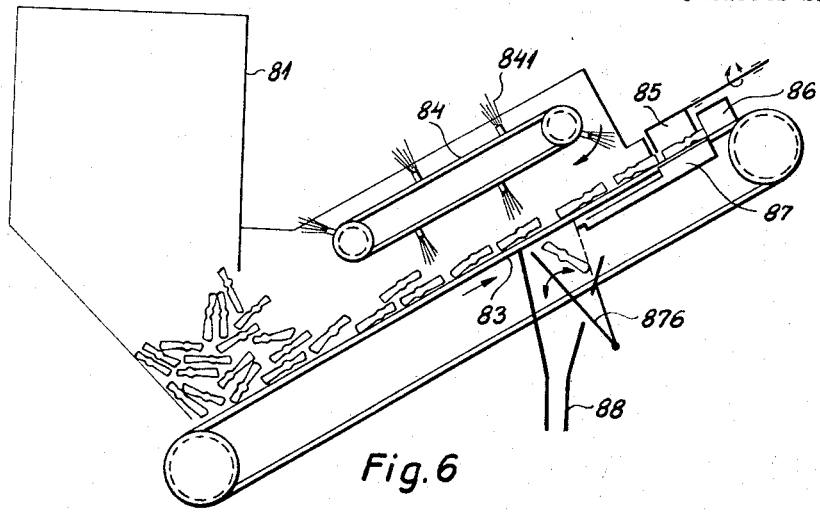
Figure 7:
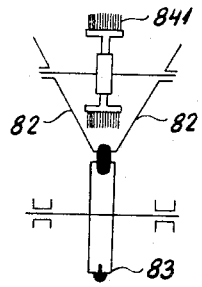
Figure 7A:
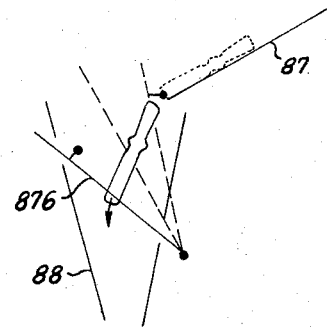
Figure 7B:
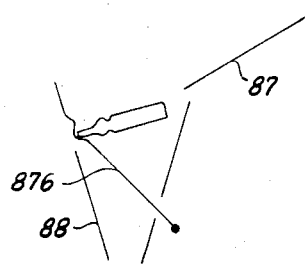
Figure 7C:
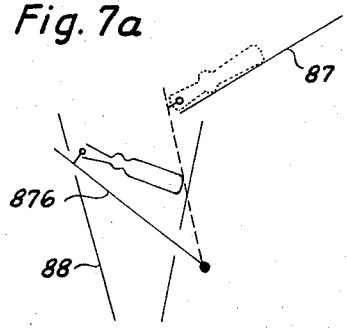

The invention is described more particularly in connection with an illustrative embodiment shown by way of example in the attached drawings, where:

FIG. 1 is a schematic diagram of an embodiment of the equipment,

FIG. 2 is the schematic diagram of the ampoule-filling unit of the equipment shown in FIG. 1, FIG. 3 represents the operating order of the unit shown in FIG. 2, FIG. 4 is a detail of the priming pump and of the actuating mechanism of an embodiment of the equipment, FIG. 5 is the front elevation of the pump shown in FIG. 4, FIG. 6 is a detail of the ampoule orienting and feeding device of the equipment, FIG. 7 is a section of the ampoule orienting and feeding device shown in FIG. 6, FIGS. 7a, 7b and 7c show the operation of the ampoule feeding and orienting device.

The equipment according to the invention is an automatic apparatus to be assembled from units of a design otherwise known per se this apparatus being provided with a batching space that has one or more batching receptacles 21 defined by the capacity of the diluent receptacle, suitable for fluidization and for deoxidation by means of argon gas filling, in which solid material is stored, the batching space having further a receptacle 3 for preparing, mixing and diluting the injection solution connected with the batching space, which is fitted with one or more electric, magnetic, mechanical or other level indicators 31, that indicate the useful capacity of the diluting space and control the batching by its indication, and which is equipped with an automatic electric or magnetic agitator 32 known per se, to be started through the control system 1 from the level indicator 31 by the rising of the liquid level itself and operated during a programmed mixing period that can be sub-ordinated to other conditions as well. Important parts of the equipment according to the invention are: a system of pumps 4 connected to the injection solution preparing receptacle 3, operating under argon gas and working with a piston head lubricated only with the liquid to be dispensed; a system of filters 5 known per se arranged after the system of pumps, providing for an ultra-filtration in the colloidal sense, effecting the removal of microorganisms and mechanical contaminants, ensuring thus freedom from fibers; a liquid receptacle 6 for the storage of the filtered solution, adapted to be filled with argon gas as protective atmosphere, fitted with one or more electric, magnetic or mechanical level indicators 61 in the lower third of the wall, with a control system 1 connected with the level indicators 61 and starting the delivery of the solution in the diluting space; a filling unit operating under inert gas, dispensing into previously deoxidized ampoules, equipped with a system of pumps 7 feeding through filling needles 95, working with a piston head lubricated only by the injection solution to be dispensed, filling and sealing the ampoules one by one during their handling, this filling unit being fitted if necessary with an ampoule chute 971 and possibly with a collecting receptacle 972 connected thereto, fitted also if necessary, with an ampoule head collecting track arranged above the filling table; the equipment has furthermore an ampoule orienting conveyor 8, and an ampoule feeding device 932.

The gas and liquid material required for the fluidizing and dissolving processes are fed by a valve system consisting of magnetic valves 24 and operated by the automatic control unit 1. Control system 1 regulates, in the case of a number of batching receptacles 21, the successive starting of the fluidizing, dissolving, and diluting operations in and from the individual receptacles, and also the selection of the individual receptacles.

A preferred embodiment of the batching receptacle 21 consists of an electrical centrifuge of a shape widening towards its free outlet portion, having one or more gas inlet holes or gaps at its bottom and a cap fitted with a cut-off valve serving for the gas outlet at its top. The centrifuge is provided with a magnet valve 24 and a solvent feeding pump 25, further with a selector that performs the starting thereof, the feeding of the liquid quantity and the starting of the operations controlled by the time-pattern control device 1. The batching receptacle is preferably also fitted with a mechanically locking, connecting and turning mechanism 23.

For the feeding of the solvent required for preparing the solution a system can be used which consists of electrically driven pumps 25 with spring-loaded active stroke, operated according to the signal received from the control device 1, the dead spaces of the pumps being adapted to be filled with argon gas.

For drying the washed ampoules one can use, among others, one or more infrared radiation sources 981 and a reflecting mirror 982 arranged above the starting portion of the filling table 91. An embodiment of the filling equipment 9 consists of a turnable filling table 91 with holding cells 911 and apertures mounted onto its periphery for the ampoules, with filling needles 95 having synchronous movement and of a number identical with the filling points, arranged above the filing table, with a movable catch mechanism 942 and an ampoule cap 952, the filled ampoules being sealed by a group of burner heads 96, which during the turning of the ampoules are movable together with the ampoules—preferably by means of an electromagnetic friction-drive—and which ensure a jet flame and are capable of achieving a limited swivelling motion at the simultaneous inert gas flow through the filling needles 95 into the ampoule space above the liquid level; the filling equipment is fitted further with apertured clamping heads 931 suitable for clamping the ampoules of different sizes pushed-in from underneath; and a turnable, liftable and lowerable by means of an external force, preferably also by means of a friction-drive, and openable equally by means of an external force, preferably also by means of a friction-drive.

With this design of the filling unit 9 it is expedient to apply such an embodiment of the equipment, the main parts of which are a lever bar 921 mounted on the center line common to the rotary filling table 91, moved and controlled by its displacement, as well as a cam disc 922 of an externally adjustable curvature, further a number of multi-jaw clamping mechanisms 931 turning by means of the aforesaid parts together with the filling points and, according to the operations, lowerable and liftable together with the clamped ampoules in such a way and to such an extent that as a result of the vertical movement, the level of the filled liquid remains constantly below the filling needle 95, while the level of the injection solution filled into the ampoules remains—at any moment of the filling process—almost constant in relation to the filling table 91. These clamping mechanisms are movable in such a way that the clamped ampoule can be turned during the irradiating and sealing operations as well, and is capable of achieving all motions required in the course of sealing. An essential feature of the filling unit is that the system of filling needles 95 is coaxial with the upper extension of the clamping apparatus and moves together with the filling track. The filling unit has further an ampoule head grasping device 942 controlled centrally from a cam disc 941. In relation to the rotary table, the ampoule is held fast by this device in the course of sealing. The embodiment of the clamping apparatus 931 of preferred design consists, on the one hand, of a centrally turnable jaw-type clamping head 931 grasping the ampoule preferably at three edges; due to this design and as a result of turning, the ampoule and the filling needle are coaxial in the case of all ampoule sizes in the working space, and, on the other hand, of a push-up bar 933 that pushes into the jaw-type clamping head 931 of the filling space the ampoule inserted centrally in the filling point. The lifting and feeding device 932 inserting the ampoules from the cells 911 arranged on the filling table 91 into the filling space is suitable for various ampoule sizes without being changed, and is mounted in a way allowing of its movement around the axle 922 fastened rigidly to the rim of the rotary table 91, and aligning itself to the required ampoule size.

For the filling needles, it is the most expedient to use corrosion-proof double filling needles 95, in which the hole serving for the gas outlet is arranged higher than the outlet hole serving for the dispensing of the injection solution.

The group of burner heads 96 is preferably of such a design that the burner heads achieve a concentric limited swivelling movement in relation to the filling table 91 and advance together with the table, while the retroactive movement, an adequate distance of the burner head group, is operated by a transmission system inserted between the two burner head groups, preferably by a geared system.

One advantageous embodiment of the orienting conveyor 8 consists in a mechanism working against the force of gravity and consisting of a gravity hopper 81, of one or more inclined walls 82 forming the continuation of said hopper, ending downward in a longitudinal gap above the belt, of a belt conveyor 83, of a layer regulating auxiliary belt 84 arranged above the belt conveyor and movable in opposite direction, of a tip-over device 85 of a limit stop mechanism 86, of rockers 876 that can be equipped with various detents achieving a movement synchronized with said mechanisms, of an inclined chute 87, and of a gravity hopper 88. The layer-regulating auxiliary belt may also be fitted with separate layer-regulating flexible mechanisms 841 e.g. with small brushes. The belt is adaptable also for achieving other tasks, e.g. for orienting the ampoules prior to stamping, for packing purposes, etc.

A special design of the feeding pump system 7 is as follows: pumps 71 have pistons 711 coupled by means of bar-actuated levers 721, the pump being driven by cam-type roller pistons 723 adjusted by means of bevel gear-726-regulated sleeves 725. The suction stroke of the pumps is adjustable in groups by means of a hand-regulated crown wheel 73 and a claw-type disc 75 coupled to the grooves of the sleeve 725 serving to carry out the corrections. Substantial elements thereof are the suction valve 762 controlled by the cam disc 761, the pressure valve 772 set in motion by the closing of the suction valve and controlled by cam disc 771, further the tension spring 773 moving the lever 721 and setting thereby the piston 711 in pressure stroke, this spring pushing simultaneously the roller piston 723 to the end of sleeve 724 during the pressure stroke. The control required in case of feeding a broken ampoule is ensured by a feeler device closing in this case the circuit with the filling needle 95; by closing the circuit, this device actuates an interconnected electromagnet 991 which lifts off axially the roller 992 of the valve 772 of the signalling filling point 772 so that the filling valve remains closed and the filling pump 71 is thus put out of circuit automatically.

The time schedule of the equipment is shown in FIG. 3.

Phase I is that time marked in an angle, at which the empty ampoule is fed by the machine into the lifting and feeding device 932 and simultaneously the filled ampoule is dropped into the collecting chute 971. In phase II the ampoule lifting and feeding device registers with the axis of filling needle 95, in phase III the filling rod 933 pushes the ampoule into the clamping head 931. In phase IV the clamping head 931 rises and then in phase V the argon filling process is started and also the infrared radiation occurs while the friction drive, directly preceding the beginning of the phase and exceeding slightly the end of the phase, ensures the turning V/I of the clamping head 931. In phase VI there takes place the dispensing of the injection solution and simultaneously the sinking of the clamping heads 931, in phase VII the sealing of the ampoules is effected by way of soldering, while during angle, i.e. phase VII/I the clamping head 931 is turned by the friction drive. (The straight arrow indicates the longitudinal axis of the machine and the direction of the preparatory process.)

The operation of the equipment according to the invention is as follows.

The powdered materials and auxiliary products are batched into receptacles 21 of a shape expanding towards their free outlet portion, the batching receptacles are placed in the closed space of the storing cell, the lid 22 of the cell is closed and simultaneously the batching centrifuge is coupled to the through-bored shaft 231 of the driving motor 23. From the gas conduit 101 the argon gas free from atmospheric oxygen is introduced through axle 231 and filter inset 211 into the receptacle during a period preset by means of control 1 in such a way that the gas and the powdered matter form a fluidized bed. After the deoxidizing time programmed beforehand has passed, the control 1 starts the turning motor 23 and by means of pump 25 and by opening the valve 24, the control feeds the deoxidized solvent liquid into the rotary batching receptacle 21 by means of the argon introduced through the perforated blow-in conduit 021 in the solvent receptacle 02. With the first operation by this method the vacuum pump 022, which is also operated by control 1, expels the air i.e. the air-argon mixture from the solvent receptacle 02 through a check-valve and, for the purpose of safe deoxidation, continues to operate during a determined time after the first argon priming charge. The liquid fed into the batching receptacle 21 is driven, together with the powdered matter, by centrifugal force to the wall of the batching receptacle, then along the wall to the outlet aperture(s). The mixture then flows by gravity through the valve 26 operated also by control 1, into the solution preparing receptacle 3.

The complete emptying of the batching receptacle is ensured in that a relatively small quantity of powdered matter is discharged by the small liquid amount fed in continuously, then the continuously arriving further liquid quantity flushing out the parts and conduits of the equipment likely to contain powdered material, transfers practically the entire quantity of the powdered matter. By means of the control 1 provision has been made for the emptying of the batching receptacles to take place only in a prescribed time and succession. Control 1 provides also for the opening of valves 26 to be coordinated with the emptying of the individual batching to receptacles. The batching receptacle 27 is fitted also with an argon outlet valve.

As soon as the powdered matter solvent and the solvent fed further on to serve as washing and diluting matter have reached in the solution preparing receptacle 3 the level predetermined by the adjustment of the electric level indicator 31, the further liquid feeding stops automatically, and simultaneously a mixing mechanism 32 is actuated that homogenizes the liquid in the solution preparing receptacle 3 by means of mixing during a determined time.

As soon as—owing to the consumption of the filling machine—the liquid level of the receptacle 6 sinks as low as the level indicator 61, the pumps 4 deliver the finished injection solution through filters 5 from the solution preparing and mixing space 3—insofar as the preparation of solution has ended there—into the receptacle 6. The pumps 4 operate as long as the electrical indicator 33 fitted onto the discharge tube of the solution preparing receptacle 3 indicates the emptying of the suction tube. At this moment they stop and the control 1 starts the liquid for the flushing of the following powder batch from the solvent receptacle filled during the previous mixing period by means of automatic valve 023 to the volume determined by level indicator 024.

The argon supply is effected from the bottle 011 or from a gas holder through filter 012 by means of adequate pressure regulation, through conduits 013 and 014. The conduit 013 serves for the argon supply of the solvent of the powdered matter and of the filling equipment, while conduit 014 provides—by continuous flushing-out—for the free argon space of the liquid receptacle 6, the mixing tank 3, and then for that of the solvent and diluent receptacle 02 and of the pumps 4.

The injection solution prepared by the aforesaid method flows through gas conduit 013 and through the channels of the rotary packing system 016 into the pipe system of the filling unit.

The ampoules to be filled are fed by the orienting and feeding device 8 driven synchronously with the drive of the filling machine, into the holding cells 911 arranged on the periphery of the filling table 91 of the filling unit 9, in a number identical with that of the filling points. The ampoules to be oriented and fed are charged into the hopper 81, whence they fall between the inclined walls 82. At the lower edge of the side walls there is an aperture, i.e. a gap corresponding to the size of the inclined belt conveyor 83 moving upwards. The possible congestion of the ampoules is prevented by the side walls 82 performing a slight movement. From among the ampoules sliding down from the hopper 81 some overlie longitudinally the belt conveyor due to the deflecting action of the inclined side walls 82 and are conveyed in consequence of the friction. Insofar as the ampoules would take along also the overlying ampoule, the sweeping-off brushes 841 arranged on the auxiliary belt 84 and moving in a direction opposite to the belt 83 sweep them back. At a predetermined point the belt 83 presses the ampoule against the stop device 86 and the ampoule is caught there. The following ampoules are closed up by the belt against the stopped ampoule.

The tip-over device 85 sweeps down the ampoules from the belt onto the inclined chutes 87 at the rate required by the feeding rate of the machine. Since the speed of belt 83 is higher than required theoretically by the capacity of the filling machine, the tip-over device 85 is supplied continuously with ampoules. Should the ampoule advancing downwardly on chute 87 arrive with its bottom forwards to the stop button of one of the rockers 876 swinging synchronously with the feeding of the filling machine, then the ampoule falls, when the rocker swings backwards, with its bottom into the gravity hopper, and thence into the cell of the filling machine 911. Should the ampoule arrive with its orifice downward to the stop button of the rocker 876, the orifice of the ampoule is caught by the button; and when the rocker swings backwards, the ampoule falls with its bottom into hopper 88.

The bottom of the ampoule fallen into the cell 911 slides, together with the turning of the table, on the border 901 of the stationary casing 90 of the filling unit until it arrives at the appropriate point and falls through the aperture on the border between the open jaws of the ampoule inserting and feeding device 932. This is built in a way allowing of its movement around the centers of rotation 912 fixed onto the border of the rotary table 91 and adjusts by itself to the required ampoule size. The control-track-operated push-up rod 933 pushes the ampoule lifted into its line, from the inserting device 932 through the aperture of the clamping head 931 of the filling space between the jaws of the clamping head. This rises and sinks according to the operation, by means of the lifting rod 921 and of the lever mechanism connecting the lifting rod with cam disc 922. The clamping head 931 is turnable also around its own center line.

The clamping heads and their mechanisms rotate together with the table around the center line of the machine. As soon as the ampoule comes into the clamping head, this latter rises and pushes the ampoule onto the filling needle 95 also arranged on the center line. The ampoule advancing together with the table arrives at this moment before the infrared radiators 981 and the ampoule becomes warmed up by the irradiation intensified by reflecting mirrors 982.

At the same time, flow of the argon gas into the ampoule through the gas passage of the filling needle is started and this gas filling continues during the whole filling process. The filling with argon is ensured by the tap joints of the argon conduit 013.

The external air circulation cannot disturb the argon flush, since the caps 952—movable otherwise along the needle—cover the aperture of the ampoules by weighing on same. From the beginning of the argon flow the driving mechanism 935 rotates the clamping head 931, ensuring hereby uniformity of warming-up. After the irradiation, the valve 772 operated by the cam disc 771 starts the delivery of the injection solution through conduit 78 into the solution channel of the filling needle 95. With the embodiment under discussion, shown by way of example, forty-two filling heads have been provided for on the rotary table for the valve 772, the forty-two filling needles being fed by fourteen pumps 71.

During the suction stroke of the pump the cam disc 724 pushes out the roller piston 725, thus establishing the suction stroke with the aid of the connecting elements, when the pump becomes filled with liquid through the suction valve 762 controlled by the cam disc 761. Upon closing of the valve 762, the cam disc 742 runs out from under the roller of the roller piston 723, and when the pressure valve 772 opens under the action of cam disc 771, the piston of the pump performs the pressure stroke under the action of the tension spring 773; then the lever mechanism 721 pushes back the roller piston with the aid of the push bar 722 to such an extent that the piston's border butts on at the end of the threaded grooves regulating sleeve 725. Since the cam disc 724 always lifts to the same height and, on the other hand, the retrogressive movement, i.e. the end position of the delivery stroke depends on the engagement of the roller piston 723, the delivery of the pump depends therefore on the adjusted position of the threaded grooved sleeve 725. The grouped adjustment of the pumps is effected in such a way that when the setting crown wheel 73 is turned off to the required extent, this drives the setting bevel gears 726 of the pumps 71 which mesh with the threaded grooved sleeve 725.

Under the action of the bevel gear rotation the sleeve moves thus farther out or farther in. The individual correcting and synchronizing setting of the pumps 71 is effected by the turning off of the claw-type discs 75 when the claws of the claw-type disc meshing with the grooves of the threaded grooved sleeve 725 turn same and the sleeve 725 turned-off in the thread of the level gear 726 also advances farther out or farther in. Since the claw-type disc 75 is toothed on its periphery, it is adjustable by means of a toothed key disposed in the bore hole 751. Insofar as the pressure tube 783 is branched to a number of valves 772, the pump can supply a number of filling points by turning the cam disc 771 in a way differing from the cam discs 724 and 761.

The cam disc 724 that operates the pumps as well as the cam disc 761 actuating the suction valves 762 of the pumps rotate in a sense opposite to that of the rotary table and of the pumps 71 turning together with same, so that during one complete rotation of the table as compared to the fixed parts, two complete rotations to the left of cam discs 724 and 761 take place.

Each pump is connected by means of the associated pressure tube 781 to the ring duct 782 in which three filling conduits 783 are attached.

When the injection solution begins to flow into the ampoule through the filling needle 95 coming to the filling stroke, the clamping head 931 begins to sink by means of its mechanism to such an extent that the level of the solution flowing into the ampoule remains constant as compared to the filling needle end, ensuring thereby that the argon inlet aperture lying higher than the solution outlet aperture of the filling needle does not cause any foaming. Upon completion of the filling process, the clamping head 931 together with the ampoule sinks so deep that the orifice of the ampoule remains still on the filling needle. At this moment, the clamping device 942 controlled by cam disc 941 seizes the head of the ampoule.

The ampoule then arrives before the sealing burner head group 96.

The unit consisting of burner heads arranged in two superimposed levels is capable of a limited swiveling movement around the center of the filling machine by means of sliding shoe 961 and of the standing piping system 962, the terminating row of flames advancing thus together with the ampoules over a predetermined distance and during a certain time. With the design under discussion the six parallel-advancing flames together with six ampoules cover a distance corresponding to one clamping head spacing, and during the same time the group of six burner heads arranged on the other level covers the same distance backwards, whereby covering a distance of two spacings backwards the terminating heating process begins.

When the ampoule neck has reached an adequate temperature, it comes in contact with the ampoule head grasping device 942 operated from cam disc 941, then the ampoule with clamping head 951 begins to sink, the ampoule neck elongates, then breaks, whereupon the stub of the sealed ampoule is rounded off by the flames. The detached ampoule head remains in the clamping head 942. As soon as the sealed ampoule leaves the flame, the clamping head 942 opens under the action of its opening mechanism and the ampoule falls through its bore hole into the chute 971 of the sealed ampoules, and thence into the collecting receptacle 972.

Should a defective, broken ampoule come into the clamping head 931 of the filling unit and be pushed up by the clamping head to the filling needle 95, this will not be filled by the machine, since in back of the ampoule head a feeling device closes the circuit with the filling needle 95 which puts the electromagnet 991 into action and this lifts out axially the lifting roll 992 of the valve 772 feeding the respective filling point. Thus the filling valve remains closed and the filling pump 71 being in its expansion stroke spring-loaded instead of being positively controlled, remains out of operation.

Driving of the filling machine is effected by means of the fixed gear drive 903 and of the electric motor 902.

We claim:

1. A method for the preparation of pure liquid pharmaceutical products in ampoules, comprising introducing an inert gas into an ampoule, passing an inert gas through powdered material, mixing the powdered material and a liquid to form a liquid solution and introducing the solution into the ampoule.

2. A method as claimed in claim 1, in which said powdered material is fluidized in contact with said inert gas.

3. A method as claimed in claim 1, and employing centrifugal force to assist in the movement of the liquid bearing the powered material into a mixing station in which the liquid solution is formed.

4. A method as claimed in claim 1, in which the ampoules are heated and the inert gas is thereafter introduced into the heated ampoules.

5. A method as claimed in claim 4, in which infrared radiation is used for heating the ampoules and said inert gas is argon.

6. A method as claimed in claim 1, in which inert gas is introduced into the ampoule from a point above the solution level in the ampoule.

7. Apparatus for filling ampoules with a solution, comprising means for passing inert gas through powdered material, means for feeding liquid and said powdered material to a mixing tank, means for mixing said liquid and powdered material in said tank to form a liquid solution, means for feeding said solution into said ampoules; and means for maintaining an inert gas atmosphere above the solution in the ampoules.

8. Apparatus as claimed in claim 7, and means for heating the ampoules prior to filling.

9. Apparatus as claimed in claim 7, and means for filling the ampoules with inert gas prior to introduction of the solution.

10. Apparatus as claimed in claim 7, and centrifugal means for feeding the powdered material and the liquid toward the mixing tank.

11. Apparatus as claimed in claim 7, including a rotary table having a plurality of ampoule-holding cells mounted thereon, filling needles above the table, and means for producing relative vertical movement of the needles and the ampoules.

12. Apparatus as claimed in claim 7, including at least a pair of filling needles for the ampoules, said needles having lower outlet ends that are spaced vertically a substantial distance apart, means for feeding solution to the needle having the lower outlet end, and means for feeding inert gas to the needle having the higher outlet end.

13. Apparatus as claimed in claim 7, and burner heads for closing the filled ampoules.

14. Apparatus as claimed in claim 7, and conveyor means for moving the ampoules to and through at least one filling station, and means for feeding ampoules one by one to said conveyor means.

15. Apparatus as claimed in claim 14, said means for feeding ampoules to said conveyor means comprising gravity chute means for orienting all the ampoules the same way.

16. Apparatus as claimed in claim 7, and means responsive to the presence of a broken ampoule to inactivate the filling apparatus in the presence of said broken ampoule.

17. Apparatus as claimed in claim 7, said means for feeding solution into the ampoules including pump means, and means maintaining said pump means under an atmosphere of inert gas.

18. Apparatus as claimed in claim 7, and conveyor means for moving the ampoules beneath the filling means, said conveyor means comprising a rotary turntable having jaw-clamping devices for individually clamping the ampoules on the conveyor means.

References Cited

UNITED STATES PATENTS

| | | | |
|---|---|---|---|
| 2,749,688 | 6/1956 | Cozzoli | 53—39 X |
| 2,908,124 | 10/1959 | Hagen | 53—37 X |
| 3,007,294 | 11/1961 | Hagen et al. | 53—112 X |

TRAVIS S. McGEHEE, *Primary Examiner.*

R. L. SPRUILL, *Assistant Examiner.*